United States Patent [19]

Schneider, Jr.

[11] 4,109,528

[45] Aug. 29, 1978

[54] SPIDER BEARING SUPPORT FOR A METER ROTOR

[75] Inventor: George William Schneider, Jr., Huntingdon Valley, Pa.

[73] Assignee: The Singer Company, New York, N.Y.

[21] Appl. No.: 782,602

[22] Filed: Mar. 29, 1977

[51] Int. Cl.² .................... G01F 3/08; G01F 15/14
[52] U.S. Cl. ............................ 73/253; 73/272 R; 308/25
[58] Field of Search ............ 73/253, 255, 257, 272 R; 308/22, 25, 178

[56] References Cited

U.S. PATENT DOCUMENTS

| | | | |
|---|---|---|---|
| 1,189,348 | 7/1916 | Costello | 73/253 X |
| 2,274,206 | 2/1942 | Marsh | 73/253 |
| 3,255,630 | 6/1966 | Karlby et al. | 73/253 |

Primary Examiner—James J. Gill

Attorney, Agent, or Firm—Harold Weinstein; Edward L. Bell; Robert E. Smith

[57] ABSTRACT

A rotary meter of the vane type having a rotary gate separating the inlet from the outlet. The rotor vanes and the gate are rotated in a predetermined timed sequence by a suitable transmission such as timing gears which interconnect the rotor and the gate. The rotor is journaled in the housing by axially spaced bearings, at least one of which is mounted in the improved spider bearing support disposed on the outboard side of the rotor. The spider bearing is connected to the housing by detachable holding tabs and positioned concentric to the rotor axis. The housing is enclosed by an end bonnet with the spider bearing support connected to the housing axially below the bonnet and intermediate the bonnet and the rotor.

The spider bearing support improves the accuracy of centering the rotor within the housing, decreasing the cost, and improving the access while simplifying the assembly.

12 Claims, 4 Drawing Figures

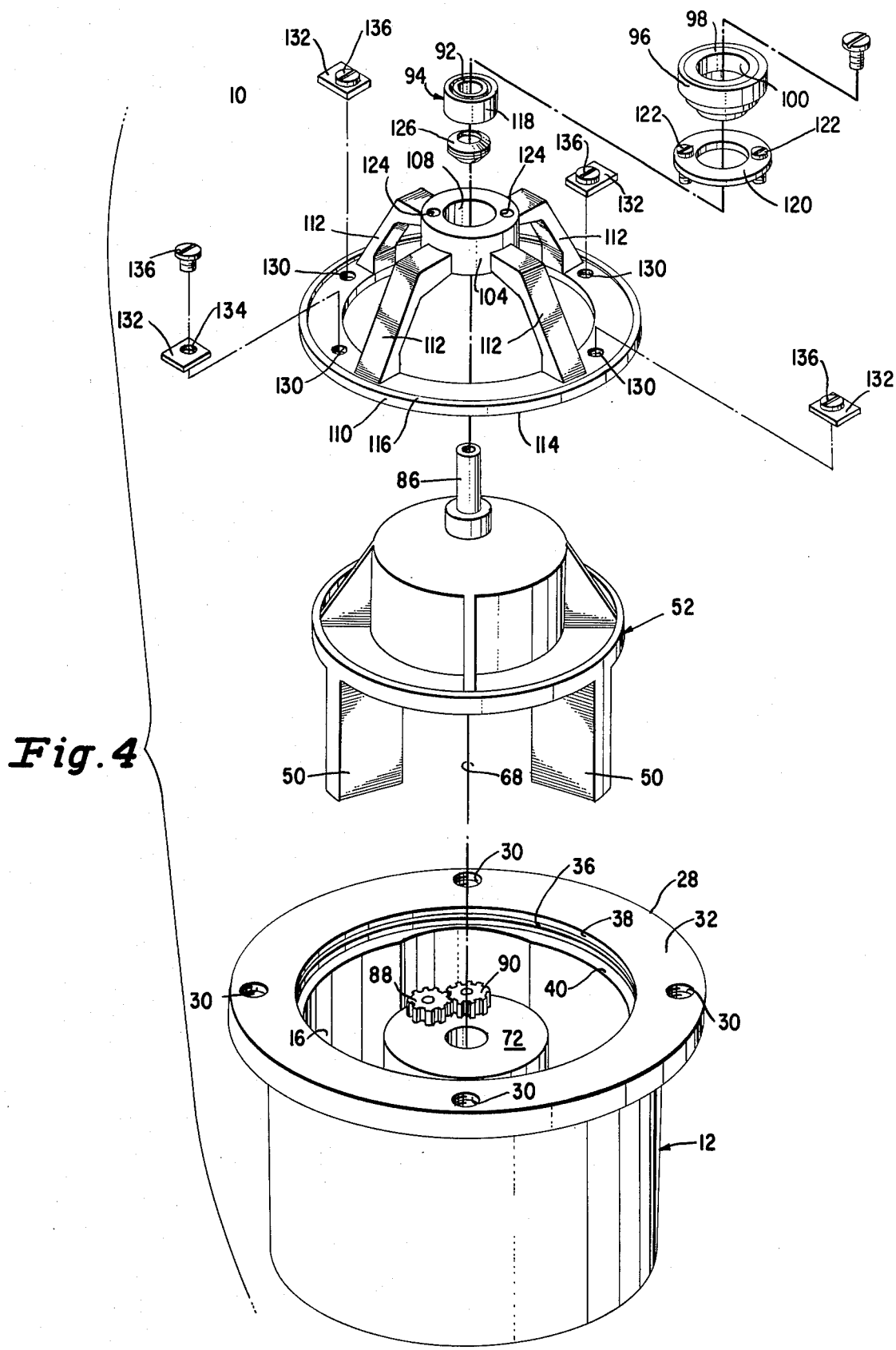

SPIDER BEARING SUPPORT FOR A METER ROTOR

BACKGROUND OF THE INVENTION

Vane type rotary meters of the prior art included rotors having through shafts journaled at either end of the housing or if non-through shafts were used to journal the rotor, the outboard end of the rotor shaft would be journaled in the end bonnet or housing closure member. This increased the difficulty in mounting the rotor within the housing, especially when mass production was involved wherein manufacturing tolerances must be strictly adhered to. Additional assembly problems could be anticipated as such an assembly procedure provided poor access to the components being connected together with virtually no visability thereof.

SUMMARY OF THE INVENTION

It is an object of the present invention to provide an improved spider bearing support for a meter rotor which overcomes the prior art disadvantages; which is simple, economical and accurate; which improves access, visability and simplifies the assembly procedure; which provides improved alignments for the journal at the outboard side of the rotor shaft; which permits the use of concentrically aligned components; which eliminates critical location of support components to the housing; which permits any angular disposition of the spider bearing support relative the housing on the rotor; which uses a spider bearing support intermediate the bonnet and the housing to journal the outboard shaft of the rotor; and which improves alignment of the rotor axis within the housing.

Other objects and advantages will be apparent from the following description of one embodiment of the invention and the novel features will be particularly pointed out hereinafter in the claims.

BRIEF DESCRIPTION OF THE INVENTION

This invention is illustrated in the accompanying drawings in which:

FIG. 4 is an exploded perspective view of the meter of FIG. 1 embodying the present invention.

DESCRIPTION OF THE INVENTION

Figure 1:
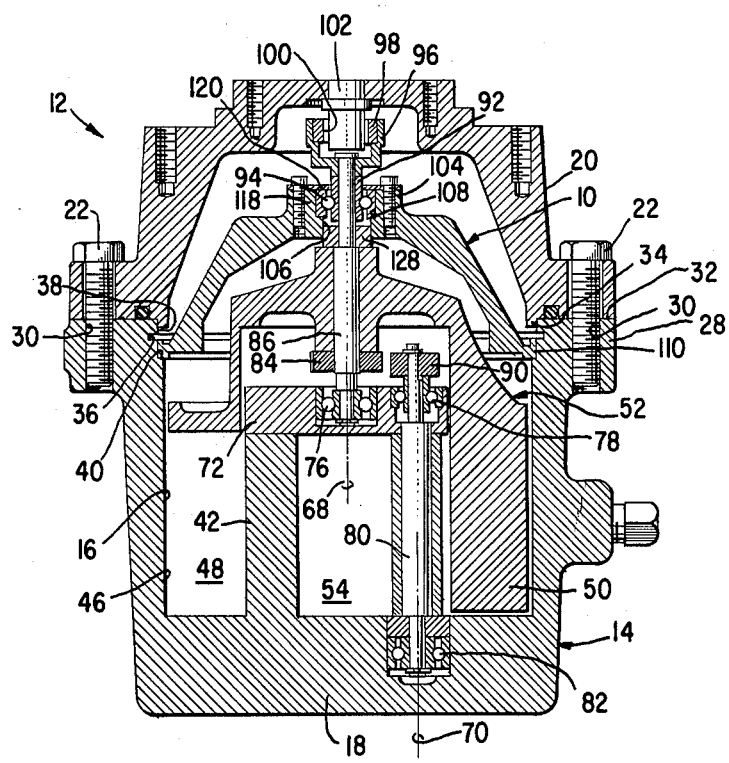
FIG. 1 is a sectional elevational view of a meter embodying the present invention.
Figure 2:
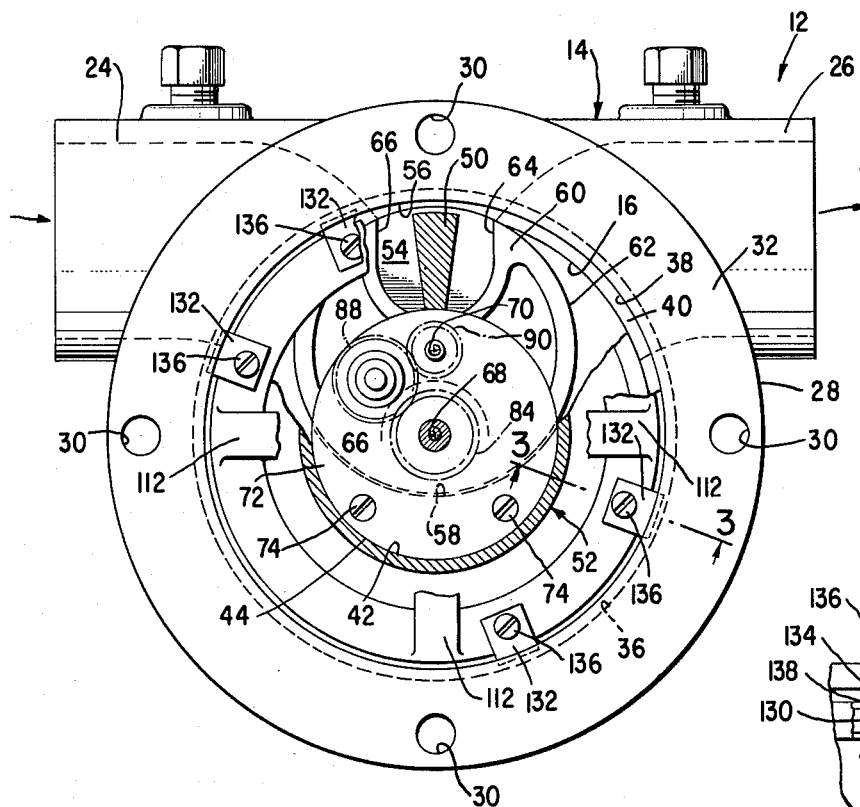
FIG. 2 is a front elevational view, partly in section, of the meter of FIG. 1 with the bonnet removed embodying the present invention.

In the embodiment of the invention illustrated in the drawings, a novel spider bearing support, designated generally 10, is shown embodied in a positive displacement rotary meter 12 depicted in FIGS. 1, 2 and 4. The meter 12 can be used to measure any fluid, but for present purposed gas measurement is assumed. The meter 12 is of a type that is briefly described herein, but for a more detailed description thereof, reference may be had to U.S. Pat. No. 3,554,032, granted Jan. 12, 1971, entitled "Rotary Fluid Meter".

The meter 12 illustrated in FIG. 1 has a housing 14 with a central opening 16. The opening 16 is closed at one end by an integral end member 18, and is closed at the other end by a bonnet 20 sealingly attached to the housing 14 by suitable fasteners 22. The housing 12 has an inlet passage 24 and an outlet passage 26 illustrated in FIG. 2.

The housing 14 as illustrated in FIG. 1 is substantially cup shaped with an annular flange 28 turning radially outwardly formed at its upper end with a plurality of circumferentially spaced tapped holes 30 formed therethrough to receive the fasteners 22. The top edge 32 of the housing 14 sealingly seats the bonnet 20 thereon of which an axially extending annular shoulder 34 overlaps to extend slightly into the central opening 16. A short distance below the top edge 32 and inwardly of the end of the shoulder 34, an annular groove 36 is formed substantially parallel to the top edge 32 in a counterbore 38 of the central opening 16 which terminates in an annular base or shoulder 40.

A stationary crescent shaped member 42, illustrated in FIGS. 1 and 2, extends vertically upwardly from the end member 18 in spaced relationship to the central opening 16, and having an outer wall surface 44 shown in fIG. 2 which is concentric with the internal wall surface 46 of the opening 16 which walls define an arcuate channel or passage 48 therebetween. The arcuate channel 48 receives the vanes or blades 50 of a rotor 52 which is mounted to rotate within the central opening 16. An offset cavity 54 within the central opening 16 is defined by the concave cylindrical surfaces 56 of the inner wall 46 and 58 formed on the inside of the crescent shaped member 42, and this cavity 54 intercepts the arcuate channel 48. A rotary gate 60 is mounted to turn in the offset cavity 54 as best seen in FIG. 2 and its outer cylindrical surface 62 fits closely within the surfaces 56 and 58. The surface 62 is interrupted to provide entrance openings 64 formed on diametrically opposite sides of the rotary gate 60 so as to form separate open spaces or pockets 66. The axis of rotation 68 of the rotor 52 intercepts the off-set cavity 54 and the path of movement of the rotary gate 60 because the diameter of the rotary gate is greater than one half the diameter of the rotor 52. The rotary gate 60 has an axis of rotation 70 parallel to the axis 68 and lies on one side thereof, which as viewed in FIG. 2, is shown to be in superposition thereto. The rotary gate 60 serves as a rotary valve to permit passage of the vanes 50, but at the same time prevents leakage of the gas between the inlet 24 and the outlet 26.

A stationary plate 72 is affixed to the top of the crescent shaped member 42 by fasteners 74. The plate 72 is circularly shaped and will extend from the outer wall 44 of the crescent across the axis 68 and 70 to lie wholly on the internal side of the arcuate channel 56 so as not to interfere with the rotation of vanes 50 as is illustrated in FIGS. 1 and 2. Concentric ball bearings 76 and 78 shown in FIG. 1 are connected in the plate 72 at the axes 68 and 70, respectively. The rotary gate 60 is affixed to a centrally disposed shaft 80 journaled in bearings 78 of plate 72 and 82 shown in FIG. 1 mounted in the end member 18.

Gear means is provided within the interior of the rotor 52 for driving the rotary gate 60 in timed relation with the rotation of the rotor 52. The gear means illustrated in FIGS. 1 and 2 includes a gear 84 fixed to a shaft 86 to which the rotor 52 is also affixed. The gear 84 meshes with an idler gear 88 rotatably mounted on the stationary plate 72 (see FIG. 2). The idler gear 88 also meshes with a gear 90 fixed to the upper end of the rotary gate shaft 80. The rotary gate 60 has two pockets 66 which rotatably receive one of three vanes 50 of the rotor 52, and therefore, the gear 84 will have more teeth than the gear 90, so that the rotary gate 60 turns at a speed one and a half times faster than the speed of the rotor 52, and in the same direction. The gas admitted into the inlet 24 causes the rotor vanes 50 to move in a counterclockwise direction as viewed in FIG. 2, and the rotary gate 60 will likewise rotate in a counterclockwise direction.

The upper end of the rotor shaft 86 is journaled by the inner race 92 of a bearing 94, which bearing is mounted in the improved spider bearing support 10 which will be described in more detail hereinafter. A hub 96 is connected to the shaft above the race 92 and has an annular magnet 98 cemented internally in the enlarged hollow interior 100 formed above the end of the shaft 86. A sleeve retainer 102 having a closed bottom is affixed to the bonnet 20 to be received within the interior 100 in non-contacting relation therein whereby a suitable magnetic coupling (now shown) will be disposed within the retainer 102 to be magnetically coupled to the magnet 98 and rotated therewith along with the rotor 52. The magnetic driven member of the retainer 102 is adapted to drive a suitable read out device or counter mechanism (not shown) to be mounted upon and enclose the bonnet 20, and arranged to be driven by the magnetic coupling 98.

The spider bearing support 10, illustrated in FIGS. 1 and 4, has a hub 104 with a central bore 106 the upper end of which has a counterbore 108, each of which is concentric to the axis 68. The hub 104 is integrally connected to a rim 110 by four webs 112 which position the rim 110 in concentric alignment to the hub 104 axially lower than the hub 104 and radially outwardly thereof. The rim 110 has an annular pad 114 formed at the outer edge of its underside and a flange 116 formed at the outer edge of the upper surface thereof. The outwardly facing surfaces of the pad 114 and the flange 116 lie in parallel planes each of which are perpendicular to the axis 68.

The spider bearing support 10 is formed in the shape of a hollow inverted cup with the webs 112 thereof and interconnected at 104 and rim 110 sized to permit the rotor 52 to rotate in the interior thereof as is illustrated in FIG. 1. The outer race 118 of the ball bearing 94 has its lower end seated within the counterbore 108, and the upper end thereof held in assembled position by a retaining plate 120 which is connected to the hub 104 by a pair of screws 122 threadedly received in tapped holes 124. The upper end of the inner race 92 contacts the drive magnet hub 96, while the lower side of the inner race 92 is supported by a pair of oppositely facing bellville washers 126 that sit on the top surface of a spacer washer 128, the undersurface of which nests on the rotor 52. The bellville washers 126 provide running clearance for the rotor 52 and also permits sufficient end adjustment thereof.

The axial distance between the underside of the pad 114 and the upperside of the flange 116 exactly corresponds to the axial distance between the annular groove 36 and the shoulder 40 which may be milled so as to lie perpendicular to the axis 68, while the counterbore 38 is concentric to the axis 68. The diameter of the rim 110 is substantially equal to the diameter of the counterbore 38 each of which are sized to permit a sliding fit therebetween. The pad 114 of the rim 110 will be inserted into the central opening 16 to sit upon the shoulder 40. This places the upper surface of the flange 116 adjacent to the lower surface of the annular groove 36.

Figure 3:
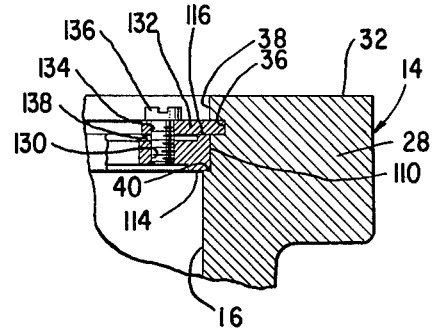
FIG. 3 is an enlarged sectional view showing a detail of the spider bearing support connected to the meter housing.

Each of the webs 112 is formed on a quadrant line to be equally distant from each other. The rim 110 will have tapped holes 130 formed inwardly from its outer circumference in spaced pairs in diametrically opposite quadrants which are depicted in FIG. 2 as being the lower right hand quadrant at the upper left hand quadrant. Holding tabs 132 are rectangularly shaped with an aperture 134 formed adjacent a narrow end. The aperture 134 is aligned with the tapped hole 130 to place the leading end of the tab 132 securely within the groove 36. A screw 136 passes through the aperture 134 and is threadedly received in the tapped hole 130 to secure the leading edge of the tab 132 within the groove 36 thus locking the annular rim 110 in assembled position as is illustrated in FIGS. 2 and 3. In the preferred embodiment of the invention the same number of holding tabs 132 were used as the number of support webs 112. A smaller number of either holding tabs 132 or webs 112 could have been used for example as little as one or two of each or the disposition and configuration of either could have been different from that depicted within the scope of the invention. The only critical point is that the spider bearing support 10 must be aseembled and remain substantially concentric to the axis 68 at the journal bearing 94.

The use of this spider bearing support 10 also greatly simplifies and aids the assembly of the meter within the housing 14 by improving the access to the components being connected prior to the final connection of the bonnet 20. For example, it is easier to check the timing of the rotor 52 to the gate 60 via the gear connection of gears 84, 88 and 90. Also connection of the outboard bearing 94 to journal the rotor shaft 86 becomes a simple assembly operation.

The holding tabs 132 are easily accessible to assemble or disassemble the spider bearing support 10 to the housing 14 since the interconnection is to be made at the top of the outer rim 110 adjacent the top edge 32 of the housing 14, with the bonnet 20 removed. Accordingly, by using highly accurately aligned components, the journal of shaft 86 by bearing 94 can be very exact while the assembly thereof remains simple, direct and accurate.

The shaft 86 is journaled in axially spaced bearings 76 and 94 which will place the axis 68 of the shaft 86 concentric with the counterbore 38. The spider bearing support 10 which is connected in the counterbore 38 serves to journal the bearing 94 on the outboard end of the rotor 52 concentric to the counterbore 38 so that the counterbore 38 acts to align the axis 68 at least at the outer end of shaft 86.

Since the spider bearing 10 is connected concentrically within the counterbore 38, its angular disposition about the axis 68 is not critical. This aids in the ease of assembly and permits the assembler merely to place the spider bearing support 10, rim 110 first, within the counterbore 38 at any angular disposition so that the webs 112 can lie on quadrant lines (see FIG. 2) or at any angle to the quadrant lines.

Screws 136 are connected in pair of tapped holes 130 formed in the second and fourth quadrants as shown in FIG. 2 to secure the holding tabs 132 within the annular groove 36 while clamping the tabs 132 to the rim 110. A space 138 is formed between the underside of the tab 132 radially inwardly of the groove 36 and the flange 116, and the upper surface of the rim 110 radially inwardly of the flange 116, as illustrated only in FIG. 3. Tightening the screw 136 produces a wedge-like action in the tabs 132 wherein the force at the inner radial end acts downwardly to produce a dual action of the tab 132 at the outer radial end (1) at the upper surface thereof exerting a greater holding force within the groove 36, and (2) at the lower surface thereof bearing down upon the flange 116 to frictionally lock the rim 110 via the pad 114 against the shoulder 40 to prevent rotation or angular drift of the spider bearing support while properly aligning the spider bearing support 10 within the counterbore 38.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A bearing support for a rotor journaled in a housing comprising:
    (a) a counterbore axially extending in the housing adjacent one end thereof,
    (b) an annular groove formed in the counterbore axially spaced from the bottom thereof,
    (c) a spider member disposed in the counterbore concentric to the axis of the rotor,
    (d) a hub formed on the spider member to journal the rotor therein, and
    (e) a plurality of holding members connected to the spider member and to extend into the annular groove to clamp the spider at the base of the counterbore to prevent axial movement of the spider.

2. The combination claimed in claim 1 wherein:
    (a) the spider member is disposed in the counterbore in any angular position relative to the axis of the rotor,
    (b) the annular groove is formed axially above the spider member, and
    (c) each of the holding members connected at predetermined circumferentially spaced points about the spider member and to extend into the annular groove at adjacent points corresponding to the said predetermined circumferentially spaced points of the spider member.

3. The combination claimed in claim 2 wherein:
    (a) a bore is formed in the housing to receive the rotor,
    (b) the bore and the counterbore each form concentrically to the axis of the rotor, and
    (c) an end bonnet connected to housing in superposition to the spider member.

4. The combination claimed in claim 3 wherein:
    (a) the spider member having an inner hub for journaling the shaft, and outer rim to engage the base of the counterbore, and a plurality of webs interconnecting the hub and the rim.

5. The combination claimed in claim 4 wherein:
    (a) the hub is formed axially upwardly and radially inwardly of the rim whereby the spider member defines an inverted open cup-shape.

6. The combination claimed in claim 2 wherein:
    (a) an annular circumferential axially extending flange formed on the rim,
    (b) the axial distance of the base of the counterbore to the underside of the groove predetermined,
    (c) the height of the rim from the underside thereof to the top edge of the flange substantially equal to the axial distance between the base and the groove,
    (d) the holding member including a holding tab and a screw,
    (e) a plurality of tapped holes circumferentially spaced about the rim, and
    (f) the screw passing through an aperature in the holding tab to be threadedly received in the tapped hole of the rim to place a holding tab within the groove to clamp the rim within the counterbore.

7. The combination claimed in claim 6 wherein:
    (a) a space formed between the underside of the holding tab and the upper surface of the rim radially inwardly of the flange whereby on tightening of the screw to the rim the holding tab is forced into a wedge-like action within the groove to urge the spider member axially in the direction of the base.

8. A bearing support for a rotary meter comprising:
    (a) a housing having an inlet, an outlet and a chamber formed therein inermediate the inlet and the outlet,
    (b) a rotary means disposed in the chamber to direct flow of fluid in the chamber from the inlet to the outlet for measurement in the meter,
    (c) the chamber having a central axis coincident to the axis of rotation of the rotary means,
    (d) the bottom of the chamber closed and the top thereof open,
    (e) an end bonnet connected to the housing to enclose the open top of the chamber,
    (f) a counterbore formed at the upper end of the chamber to extend axially therein in concentric relation to the axis of the rotor,
    (g) a spider member connected in the counterbore to journal the outborad end of the rotor in spaced relation to the end bonnet in concentric relationship to the axis of rotation of the rotor,
    (h) an annular groove formed in the counterbore, and
    (i) a plurality of holding members connected to the spider member and to extend into the annular groove to frictionally lock the spider member to the housing within the counterbore.

9. The combination claimed in claim 8 wherein:
    (a) the spider member has an outer rim,
    (b) a plurality of tapped holes formed in the rim,
    (c) each of the holding members including a screw and a holding tab, and
    (d) each of the holding tabs to extend into the annular groove at one end thereof, and at the other end thereof, to be connected by the screw being threadedly received in the tapped holes.

10. A bearing support for a rotary meter comprising:
    (a) a housing having an inlet, an outlet and a chamber formed therein intermediate the inlet and the outlet,
    (b) a rotary means disposed in the chamber to direct the flow of fluid in the chamber from the inlet to the outlet for measurement in the meter,
    (c) the chamber having a central axis coincident to the axis of rotation of the rotary means,
    (d) the bottom of the chamber closed and the top thereof open,
    (e) an end bonnet connected to the housing to enclose the open top of the chamber,
    (f) a shoulder formed at the upper end of the chamber by an axially extending counterbore therein in concentric relation to the axis of the rotor,
    (g) a spider member seated upon the shoulder and to journal the outboard end of the rotor in spaced relation to the end bonnet in concentric relationship to the axis of rotation of the rotor, (h) at least one elongated groove of predetermined length formed above the shoulder, and
(i) at least one holding member of substantially shorter length than the groove to be connected to the spider member and to extend into the elongated groove to clamp the spider membe upon the shoulder.

11. The combination claimed in claim 10 wherein:
(a) a plurality of holding members are interconnected between the elongated groove and the spider member.

12. The combination claimed in claim 11 wherein:
(a) the shoulder is annular, and
(b) the groove is annular and formed parallel to the shoulder.

* * * * *